(12) United States Patent
Nagamitsu et al.

(10) Patent No.: US 10,985,362 B2
(45) Date of Patent: Apr. 20, 2021

(54) ELECTROCHEMICAL DEVICE, NEGATIVE ELECTRODE USED FOR SAME, AND METHOD FOR MANUFACTURING ELECTROCHEMICAL DEVICE

(71) Applicant: Panasonic Intellectual Property Management Co., Ltd., Osaka (JP)

(72) Inventors: Kenichi Nagamitsu, Hyogo (JP); Atsuro Shirakami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 24 days.

(21) Appl. No.: 16/074,793

(22) PCT Filed: Feb. 21, 2017

(86) PCT No.: PCT/JP2017/006262
§ 371 (c)(1),
(2) Date: Aug. 2, 2018

(87) PCT Pub. No.: WO2017/150264
PCT Pub. Date: Sep. 8, 2017

(65) Prior Publication Data
US 2019/0067676 A1    Feb. 28, 2019

(30) Foreign Application Priority Data
Feb. 29, 2016    (JP) .............................. JP2016-038014

(51) Int. Cl.
*H01M 4/62*    (2006.01)
*H01M 4/38*    (2006.01)
(Continued)

(52) U.S. Cl.
CPC .......... *H01M 4/0459* (2013.01); *H01G 11/06* (2013.01); *H01G 11/26* (2013.01);
(Continued)

(58) Field of Classification Search
None
See application file for complete search history.

(56) References Cited

U.S. PATENT DOCUMENTS

| | | | | |
|---|---|---|---|---|
| 2011/0068001 A1* | 3/2011 | Affinito | ................. | H01M 4/134 |
| | | | | 204/242 |
| 2014/0023898 A1* | 1/2014 | Minami | .............. | H01M 2/1673 |
| | | | | 429/94 |
| 2015/0340732 A1* | 11/2015 | Kim | .................... | H01M 10/058 |
| | | | | 429/94 |

FOREIGN PATENT DOCUMENTS

JP    2009-272585       11/2009
JP    2013-74283 A      4/2013
(Continued)

OTHER PUBLICATIONS

International Search Report of PCT application No. PCT/JP2017/006262 dated May 23, 2017.

*Primary Examiner* — Ula C Ruddock
*Assistant Examiner* — Amanda Rosenbaum
(74) *Attorney, Agent, or Firm* — McDermott Will & Emery LLP (57) ABSTRACT

A negative electrode for an electrochemical device includes: a negative current collector; a first negative electrode active material layer supported on a first surface of the negative current collector; and a second negative electrode active material layer supported on a second surface of the negative current collector. And capacity C1 per unit mass of the first negative electrode active material layer is greater than capacity C2 per unit mass of the second negative electrode active material layer. As a result, it is possible to provide a negative electrode suited for an electrochemical device having high capacitance, the electrochemical device being manufactured by pre-doping the negative electrode with lithium ions.

18 Claims, 1 Drawing Sheet

(51) Int. Cl.
*H01M 4/134* (2010.01)
*H01M 4/13* (2010.01)
*H01M 4/04* (2006.01)
*H01M 4/02* (2006.01)
*H01M 10/0587* (2010.01)
*H01M 10/0585* (2010.01)
*H01M 10/0566* (2010.01)
*H01M 10/0525* (2010.01)
*H01G 11/06* (2013.01)
*H01G 11/50* (2013.01)
*H01G 11/86* (2013.01)
*H01G 11/26* (2013.01)
*H01G 11/84* (2013.01)
*H01G 11/30* (2013.01)
*H01G 11/28* (2013.01)
*H01M 4/36* (2006.01)
*H01G 11/52* (2013.01)
*H01G 11/58* (2013.01)

(52) U.S. Cl.
CPC ............ *H01G 11/28* (2013.01); *H01G 11/30* (2013.01); *H01G 11/50* (2013.01); *H01G 11/84* (2013.01); *H01G 11/86* (2013.01); *H01M 4/13* (2013.01); *H01M 4/134* (2013.01); *H01M 4/366* (2013.01); *H01M 4/382* (2013.01); *H01M 10/0525* (2013.01); *H01M 10/0566* (2013.01); *H01M 10/0585* (2013.01); *H01M 10/0587* (2013.01); *H01G 11/52* (2013.01); *H01G 11/58* (2013.01); *H01M 4/621* (2013.01); *H01M 2004/027* (2013.01); *H01M 2300/0037* (2013.01); *Y02E 60/13* (2013.01)

(56) References Cited

FOREIGN PATENT DOCUMENTS

WO 2015/166622 11/2015
WO WO-2015166622 A1 * 11/2015 .............. H01M 4/38

* cited by examiner

ELECTROCHEMICAL DEVICE, NEGATIVE ELECTRODE USED FOR SAME, AND METHOD FOR MANUFACTURING ELECTROCHEMICAL DEVICE

This application is a U.S. national stage application of the PCT International Application No. PCT/JP2017/006262 filed on Feb. 21, 2017, which claims the benefit of foreign priority of Japanese patent application 2016-038014 filed on Feb. 29, 2016, the contents all of which are incorporated herein by reference.

TECHNICAL FIELD

The present disclosure relates to an electrochemical device manufactured by pre-doping a negative electrode with lithium ions

BACKGROUND

Electrochemical devices that store electric energy can be roughly classified into high-capacitance electrochemical devices that perform charging and discharging by a faradaic reaction and high-output electrochemical devices that perform charging and discharging by a non-faradaic reaction. As the high-capacitance electrochemical device, a lithium ion secondary battery is mainstream, and as the high-output electrochemical device, an electric double layer capacitor is typical.

In recent years, an electrochemical device having property intermediate between the lithium ion secondary battery and the electric double layer capacitor also attracts attention. For example, a lithium ion capacitor has a structure in which a positive electrode used for a capacitor and a negative electrode used for a lithium ion secondary battery are combined, and has both property of the former and the latter. In such an electrochemical device, the potential difference between the positive electrode and the negative electrode is increased by decreasing the potential of the negative electrode by preliminarily doping (pre-doping) the negative electrode with lithium ions for ensuring the capacitance.

The pre-doping of lithium ions on the negative electrode is performed, for example, in the following manner. After forming an electrode group by winding the positive electrode and the negative electrode with a separator interposed therebetween, a lithium foil having a sufficient thickness is attached to the outermost circumference of the electrode group. And then the lithium foil and the electrode group are shorted in a nonaqueous electrolytic solution. While this method is simple, this method has disadvantages that it is difficult to make lithium ions migrate uniformly all over the negative electrode, and it takes a long time to complete the pre-doping.

Meanwhile, a technique of performing a pre-doping by previously forming an electrode group by winding the negative electrode together with the positive electrode and the separator in the condition that a lithium foil, which is thinly pressed, is disposed on both sides of the negative electrode is also proposed (Unexamined Japanese Patent Publication No. 2009-272585).

SUMMARY

In order to attach the lithium foil on a surface of the negative electrode, it is necessary to impart a sufficient bonding strength between the negative electrode active material layer and the lithium foil, in addition to a bonding strength between the negative electrode active material layer and the negative current collector, and a bonding strength among active material particles in the negative electrode active material layer. Hence, it is necessary to limit the amount of the active material contained in the negative electrode active material layer. That limits an increase in capacity of the negative electrode.

In view of the above, one aspect of the present disclosure relates to a negative electrode for an electrochemical device. The negative electrode includes: a negative current collector; a first negative electrode active material layer supported on a first surface of the negative current collector; and a second negative electrode active material layer supported on a second surface of the negative current collector. Capacity C1 per unit mass of the first negative electrode active material layer is greater than capacity C2 per unit mass of the second negative electrode active material layer.

Another aspect of the present disclosure relates to an electrochemical device. The electrochemical device includes a positive electrode, the above negative electrode, a separator disposed between the positive electrode and the negative electrode, and a nonaqueous electrolytic solution having lithium ion conductivity.

Still another aspect of the present disclosure relates to a method for manufacturing an electrochemical device. The method includes the steps of: preparing a negative electrode including a negative current collector, a first negative electrode active material layer supported on a first surface of the negative current collector, and a second negative electrode active material layer supported on a second surface of the negative current collector; preparing a positive electrode including a positive current collector, and a positive electrode active material layer supported on a surface of the positive current collector; attaching a lithium foil on a surface of the second negative electrode active material layer; forming an electrode group by winding or laminating the negative electrode having the lithium foil attached and the positive electrode with a separator interposed between the negative electrode and the positive electrode; and doping the first negative electrode active material layer and the second negative electrode active material layer with lithium from the lithium foil by bringing the electrode group into contact with a nonaqueous electrolytic solution. Capacity C1 per unit mass of the first negative electrode active material layer is greater than capacity C2 per unit mass of the second negative electrode active material layer.

In the negative electrode for an electrochemical device, by making the capacity per unit mass of the negative electrode active material layer supported on the first surface of the negative current collector larger than the capacity per unit mass of the negative electrode active material layer supported on the second surface of the negative current collector, it is possible to obtain an electrochemical device having high capacitance even when pre-doping is performed by attaching the lithium foil on the negative electrode.

DESCRIPTION OF EMBODIMENTS

A negative electrode according to the present disclosure relates to a negative electrode for an electrochemical device that exerts the capacitance by the Faraday reaction mainly involved by lithium ions. The negative electrode includes a negative current collector, a first negative electrode active material layer supported on one surface of the negative current collector, and a second negative electrode active material layer supported on the other surface of the negative current collector. It is so designed that capacity C1 per unit mass of the first negative electrode active material layer is greater than capacity C2 per unit mass of the second negative electrode active material layer.

On the second negative electrode active material layer, a lithium foil is attached as a supply source of lithium ions to be doped to the negative electrode. Hence, the second negative electrode active material layer needs to have a sufficient bonding strength with the lithium foil. Meanwhile the negative electrode active material by itself has a small bonding strength with the lithium foil. Thus, the amount of the negative electrode active material that can be contained in the second negative electrode active material layer is limited. On the other hand, since the first negative electrode active material layer does not need to have the bonding strength with the lithium foil, the first negative electrode active material layer can contain a larger amount of the negative electrode active material than the second negative electrode active material layer.

When each of the first negative electrode active material layer and the second negative electrode active material layer contains a negative electrode active material capable of doping or dedoping with lithium ions, and a binder, content X1 of the binder contained per unit mass of the first negative electrode active material layer may be less than content X2 of the binder contained per unit mass of the second negative electrode active material layer. The binder acts as a resistance component that does not contribute to the capacitance of the electrochemical device. By making X1 less than X2, the resistance of the first negative electrode active material layer is reduced, and thus the internal resistance of the electrochemical device decreases. Further, by making X2 greater than X1, it is possible to make arithmetic average roughness Ra2 of the surface of the second negative electrode active material layer at far side from the negative current collector less than arithmetic average roughness Ra1 of the surface of the first negative electrode active material layer at far side from the negative current collector. This makes it easy to attach a lithium foil on a surface of the second negative electrode active material layer in case of attaching the lithium foil to the second negative electrode active material layer.

When X1 is less than X2, a conductivity of the second negative electrode active material layer is less than a conductivity of the first negative electrode active material layer. Hence, it is preferable that at least the second negative electrode active material layer contains a conductive assistant. Further, when each of the first negative electrode active material layer and the second negative electrode active material layer contains a conductive assistant, content Y1 of the conductive assistant per unit mass of the first negative electrode active material layer can be less than content Y2 of the conductive assistant per unit mass of the second negative electrode active material layer.

When C1 is greater than C2, thickness T1 of the first negative electrode active material layer may be smaller than thickness T2 of the second negative electrode active material layer. This reduces the entire thickness of the negative electrode, and thus it is advantageous in increasing the capacitance of the electrochemical device.

At this time, it is preferable that T1 and T2 are designed so as to satisfy $0.99 \leq Cs1/Cs2 \leq 1.01$ where Cs1 represents capacity per unit area of the first negative electrode active material layer, and Cs2 represents capacity per unit area of the second negative electrode active material layer. From this, the capacity balance between both sides of the negative electrode can be good, and thus it is easy to obtain excellent cycle characteristics.

An electrochemical device according to the present disclosure includes a positive electrode, the aforementioned negative electrode, a separator disposed between the positive electrode and the negative electrode, and a nonaqueous electrolytic solution having lithium ion conductivity.

The positive electrode includes a positive current collector, and a positive electrode active material layer supported on a surface of the positive current collector. Here, it is preferable that at least one of the positive current collector and the negative current collector has lithium ion permeability. When the positive current collector has lithium ion permeability, lithium ions eluted from the lithium foil can pass through the positive electrode and rapidly reach the first negative electrode active material layer of the neighboring negative electrode. When the negative current collector has lithium ion permeability, lithium ions eluted from the lithium foil can pass through the negative current collector, and rapidly reach the first negative electrode active material layer at the back side. Therefore, pre-doping proceeds rapidly even when a lithium foil for pre-doping is not attached to the first negative electrode active material layer, and a lithium foil is attached to the second negative electrode active material layer. Also, lithium ions become more likely to reach uniformly all over the negative electrode.

A method for manufacturing an electrochemical device according to the present disclosure includes the steps of: preparing a negative electrode including a negative current collector, a first negative electrode active material layer supported on one surface of the negative current collector, and a second negative electrode active material layer supported on the other surface of the negative current collector; preparing a positive electrode including a positive current collector, and a positive electrode active material layer supported on both sides of the positive current collector; attaching a lithium foil on a surface of the second negative electrode active material layer; forming an electrode group by winding or laminating the negative electrode having the lithium foil attached and the positive electrode with a separator interposed between the negative electrode and the positive electrode; and doping the first negative electrode active material layer and the second negative electrode active material layer with lithium from the lithium foil by bringing the electrode group into contact with a nonaqueous electrolytic solution. In the above manufacturing method, as described above, capacity C1 per unit mass of the first negative electrode active material layer may be greater than capacity C2 per unit mass of the second negative electrode active material layer.

In the above manufacturing method, when at least one of the positive current collector and the negative current collector has lithium ion permeability, pre-doping proceeds rapidly, and lithium ions can reach uniformly all over the negative electrode.

The lithium foil may have such a mass that can dope the first negative electrode active material layer and the second negative electrode active material layer with lithium ions. The mass of the lithium foil is preferably a necessary and sufficient amount because residual lithium in the metallic state can influence on the cycle characteristics. Regarding this point, when a lithium foil is attached on each of both sides of the negative electrode, it is necessary to use a lithium foil having a thickness of less than 10 μm. This takes time and labor for rolling, and results in high cost for the lithium foil. On the other hand, when a lithium foil is not attached to a surface of the first negative electrode active material layer, but a lithium foil is attached on a surface of the second negative electrode active material layer, the thickness of the lithium foil may be 10 μm or more. Hence, the cost required for the lithium foil becomes low, and the handling of the lithium foil can be facilitated.

Hereinafter, each constituent of the electrochemical device will be described in more detail.

(Negative Electrode)

The negative electrode includes a negative current collector, a first negative electrode active material layer supported on one surface of the negative current collector, and a second negative electrode active material layer supported on the other surface of the negative current collector. The first negative electrode active material layer and the second negative electrode active material layer are formed in the same manner except that the capacities per unit mass are different from each other.

For example, a conductive sheet material is used for the negative current collector. As the sheet material, a metal foil, a metal porous body, a punching metal or the like can be used. As a material of the negative current collector, copper, a copper alloy, nickel, stainless steel or the like can be used. The negative current collector may have lithium ion permeability. As the negative current collector having lithium ion permeability, a foil having pores on the surface such as punching metal or etching metal is preferred.

Both of the first negative electrode active material layer and the second negative electrode active material layer may contain a binder, a conductive assistant and the like besides the negative electrode active material. Hence, capacity C1 per unit mass of the first negative electrode active material layer and capacity C2 per unit mass of the second negative electrode active material layer are adjusted so that C1>C2 by changing a mass ratio (composition) between the negative electrode active material and other component contained in the negative electrode active material layer. In other words, mass M1 of the negative electrode active material contained per unit mass of the first negative electrode active material layer is greater than mass M2 of the negative electrode active material contained per unit mass of the second negative electrode active material layer.

Meanwhile, from the viewpoint of achieving excellent cycle characteristics of the electrochemical device, it is preferable that capacity Cs1 per unit area of the first negative electrode active material layer and capacity Cs2 per unit area of the second negative electrode active material layer are equivalent. And even if there is some difference between Cs1 and Cs2, it is preferable to satisfy 0.99≤Cs1/Cs2≤1.01.

A C1/C2 ratio or a M1/M2 ratio may be greater than 1, and is preferably greater than 1.03. On the other hand, if the C1/C2 ratio or the M1/M2 ratio is too great, it is difficult to fit capacity Cs1 per unit area of the first negative electrode active material layer with capacity Cs2 per unit area of the second negative electrode active material layer. Thus the difference between Cs1 and Cs2 is likely to be large. Therefore, it is preferable that the C1/C2 ratio or the M1/M2 ratio is 1.05 or less.

Examples of the negative electrode active material include a carbon material, a metal compound, an alloy, a ceramic material and the like. As the carbon material, non-graphitizable carbon (hard carbon), easily graphitizable carbon (soft carbon), graphite and the like are preferred, and hard carbon is particularly preferred from the viewpoint of achieving high output. Examples of the metal compound include silicon oxide, tin oxide, and the like. Examples of the alloy include a silicon alloy, a tin alloy, and the like. Examples of the ceramic material include lithium titanate, lithium manganate, and the like. These materials may be used alone, or may be used in combination of two or more of these materials.

Examples of the conductive assistant include carbon black, carbon fibers, and the like. Among these, carbon black is preferred, and in carbon black, acetylene black, Ketjen black or the like is preferably used in view of excellent conductivity.

The binder is a resin component. Rubber particles, a cellulose derivative, a fluororesin, an acrylic resin, a polyimide resin, and the like are used as the binder. Examples of the rubber material include styrene butadiene rubber (SBR), and examples of the cellulose derivative include carboxymethyl cellulose (CMC) and a derivative thereof (e.g., Na salt, aluminum salt and the like of CMC). Examples of the fluororesin include polyvinylidene fluoride, polytetrafluoroethylene (PTFE), tetrafluoroethylene-hexafluoropropylene copolymer, and the like. Examples of the acrylic resin include polyacrylic acid, acrylic acid-methacrylic acid copolymer, and the like. A content ratio of the binder used preferably ranges from 2 parts by mass to 5 parts by mass, inclusive, relative to 100 parts by mass of the negative electrode active material.

The negative electrode active material layer is formed by preparing a slurry by dispersing a negative electrode mixture substance that contains the negative electrode active material, the binder and the like in a liquid component (dispersion medium), and then applying the slurry on a surface of the negative current collector. The binder that is soluble in the dispersion medium imparts the viscosity to the slurry. When the binder is not soluble in the dispersion medium, it is preferable that a binder that is soluble in the dispersion medium is used in combination with the binder that is not soluble in the dispersion medium in order to impart the viscosity to the slurry. For example, when SBR is used, it is preferred to use CMC or a CMC derivative in combination. In this case, a content ratio of CMC or a CMC derivative preferably ranges from 1 part by mass to 2 parts by mass, inclusive, relative to 100 parts by mass of the negative electrode active material.

When each of the first negative electrode active material layer and the second negative electrode active material layer contains a binder, content X1 of the binder per unit mass of the first negative electrode active material layer may be less than content X2 of the binder per unit mass of the second negative electrode active material layer. As a result, it is possible to impart a sufficient bonding strength with a lithium foil to the second negative electrode active material layer while ensuring the high capacity by the first negative electrode active material layer. The binder acts as a resistance component that does not contribute to the capacitance of the electrochemical device. Hence, by making X1 less than X2, increase in the internal resistance of the electrochemical device is suppressed. A X1/X2 ratio may be less than 1, and preferably ranges from 0.33 to 0.7, inclusive. Further, by making X2 greater than X1, arithmetic average roughness Ra2 of the surface of the second negative electrode active material layer at far side from the negative current collector can be less than arithmetic average roughness Ra1 of the surface of the first negative electrode active material layer at far side from the negative current collector.

When a lithium foil is not attached to the first negative electrode active material layer, but attached to the second negative electrode active material layer in pre-doping with lithium ions, it becomes easy to attach a lithium foil on a surface of the second negative electrode active material layer.

When a carbon material is used as the negative electrode active material, and SBR is used as the binder, a content ratio of SBR relative to 100 parts by mass of the negative electrode active material (carbon material) in the first negative electrode active material layer preferably ranges from 2 parts by mass to 3 parts by mass, inclusive. On the other hand, a content ratio of SBR relative to 100 parts by mass of the negative electrode active material (carbon material) in the second negative electrode active material layer preferably ranges from 5 parts by mass to 6 parts by mass, inclusive. At this time, a $Z1/Z2$ ratio preferably ranges from 0.33 to 0.6, inclusive, more preferably ranges from 0.4 to 0.6, inclusive, where $Z1$ represents content of SBR per unit mass of the first negative electrode active material layer, and $Z2$ represent content of SBR per unit mass of the second negative electrode active material layer. At this time, arithmetic average roughness $Ra2$ of the surface of the second negative electrode active material layer at far from the negative current collector preferably ranges from 3 μm to 5 μm, inclusive.

The negative electrode active material layer may contain a conductive assistant. A content ratio of the conductive assistant preferably ranges from 0 parts by mass to 10 parts by mass, inclusive, relative to 100 parts by mass of the negative electrode active material. When the amount of the binder contained in the first negative electrode active material layer is reduced, the conductivity in the first negative electrode active material layer becomes relatively higher than the conductivity in the second negative electrode active material layer. Considering the balance of conductivity between the first negative electrode active material layer and the second negative electrode active material layer, it is preferable that at least the second negative electrode active material layer contains a conductive assistant. This results in improvement in the conductivity of the second negative electrode active material layer and improvement in rate characteristics and cycle characteristics.

When each of the first negative electrode active material layer and the second negative electrode active material layer contains a conductive assistant, it is preferred that content $Y1$ of the conductive assistant per unit mass of the first negative electrode active material layer is less than content $Y2$ of the conductive assistant per unit mass of the second negative electrode active material layer. That is, a $Y1/Y2$ ratio is preferably less than 1, and more preferably ranges from 0 to 0.1.

Since the content of the binder in the first negative electrode active material layer can be reduced as compared with the second negative electrode active material layer, it is possible to make thickness $T1$ of the first negative electrode active material layer smaller than thickness $T2$ of the second negative electrode active material layer. In other words, when a lithium foil is not attached to the first negative electrode active material layer, but attached to the second negative electrode active material layer in pre-doping with lithium ions, it is possible to make the electrode group small as compared with the case where a lithium foil is attached to each of both of the first negative electrode active material layer and the second negative electrode active material layer. This is further advantageous in achieving high capacitance of the electrochemical device. A $T1/T2$ ratio is, for example, less than 1, and preferably 0.97 or less, and preferably 0.85 or more.

(Positive Electrode)

The positive electrode includes, for example, a positive current collector, and a positive electrode active material layer supported on a surface of the positive current collector.

For example, a conductive sheet material is used for the positive current collector. As the sheet material, a metal foil, a metal porous body, a punching metal or the like is used. As a material of the positive current collector, aluminum, an aluminum alloy, titanium, a titanium alloy, stainless steel or the like can be used. The positive current collector may have lithium ion permeability. As the positive current collector having lithium ion permeability, a foil having pores on the surface such as punching metal or etching metal is preferred.

It is preferable that the positive electrode active material layer contains a carbon material, a conductive polymer or the like as a positive electrode active material. The carbon material exerts the capacity by electrostatic adsorption and desorption of anion or cation to a surface of activated carbon. By using the carbon material, it is possible to obtain an electrochemical device having high output and high capacitance as compared with an electric double layer capacitor. As the carbon material, a material having a large specific surface area is preferred, and examples of the carbon material include activated carbon, polyacene (PAS) and polycyclic aromatic hydrocarbons (PAHs).

The conductive polymer exerts the capacity by the oxidation-reduction reaction accompanied by doping and dedoping of anion. By using the conductive polymer, it is possible to obtain an electrochemical device having high output and high capacitance as compared with an electric double layer capacitor or a lithium ion capacitor.

As the conductive polymer, a π-conjugated polymer is preferred, and polypyrrole, polythiophene, polyfuran, polyaniline, polythiophene vinylene, polypyridine, and derivatives thereof can be used. These compounds may be used alone, or may be used in combination of two or more of these compounds. A weight average molecular weight of the conductive polymer is not particularly limited and ranges, for example, from 1000 to 100000, inclusive.

As for derivatives of the π-conjugated polymer, derivatives of polypyrrole, polythiophene, polyfuran, polyaniline and the like mean polymers having, as a basic skeleton, polypyrrole, polythiophene, polyaniline, polythiophene vinylene, polypyridine and the like, respectively. For example, a polythiophene derivative includes poly(3,4-ethylenedioxythiophene) (PEDOT).

The conductive polymer exerts excellent conductivity by preliminarily doping with anion as a dopant. As the dopant, an anion that is relatively hardly dedoped from the conductive polymer is preferred, and an oxo acid anion not containing a halogen atom is preferred. Examples of the oxo acid anion not containing a halogen atom include a sulfate ion, a nitrate ion, a phosphate ion, a borate ion, and a sulfonate ion. Examples of the sulfonate ion include a benzenesulfonate ion, a methanesulfonic acid ion, and a toluenesulfonic acid ion. Among these oxo acid anions, a sulfate ion, a sulfonate ion and the like are preferred in that these tend to be stable in the conductive polymer. These anions may be used alone, or may be used in combination of two or more of these anions.

The dopant may be a polymer anion. Examples of the polymer anion include ions of polyvinylsulfonic acid, polystyrenesulfonic acid, polyallylsulfonic acid, polyacrylsulfonic acid, polymethacrylsulfonic acid, poly(2-acrylamido-2- methylpropanesulfonic acid), polyisoprenesulfonic acid, and polyacrylic acid. These polymers may be a homopolymer or a copolymer of two or more kinds of monomers. These anions may be used alone, or may be used in combination of two or more of these anions.

(Nonaqueous Electrolytic Solution Having Lithium Ion Conductivity)

The nonaqueous electrolytic solution having lithium ion conductivity includes a lithium salt and a nonaqueous solvent for dissolving the lithium salt. An anion derived from a lithium salt repeats doping and dedoping with the positive electrode reversibly in association with charging and discharging of the electrochemical device. On the other hand, a lithium ion derived from a lithium salt is adsorbed to the negative electrode or released from the negative electrode in association with charging and discharging of the electrochemical device.

Examples of the lithium salt include $LiClO_4$, $LiBF_4$, $LiPF_6$, $LiAlCl_4$, $LiSbF_6$, LiSCN, $LiCF_3SO_3$, $LiFSO_3$, $LiCF_3CO_2$, $LiAsF_6$, $LiB_{10}Cl_{10}$, LiCl, LiBr, LiI, $LiBCl_4$, $LiN(FSO_2)_2$, $LiN(CF_3SO_2)_2$ and the like. These lithium salts may be used alone, or may be used in combination of two or more of these lithium salts. A concentration of the lithium salt in the nonaqueous electrolytic solution may, for example, range from 0.2 mol/L to 4 mol/L, inclusive, and is not particularly limited.

Examples of the nonaqueous solvent that can be used include cyclic carbonates such as ethylene carbonate, propylene carbonate, and butylene carbonate; chain carbonates such as dimethyl carbonate, diethyl carbonate, and ethyl methyl carbonate; aliphatic carboxylate esters such as methyl formate, methyl acetate, methyl propionate, and ethyl propionate; lactones such as γ-butyrolactone and γ-valerolactone; chain ethers such as 1,2-dimethoxyethane (DME), 1,2-diethoxyethane (DEE) and ethoxymethoxyethane (EME); cyclic ethers such as tetrahydrofuran and 2-methyltetrahydrofuran; dimethylsulfoxide, 1,3-dioxolane, formamide, acetamide, dimethylformamide, dioxolane, acetonitrile, propionitrile, nitromethane, ethylmonoglyme, trimethoxymethane, sulfolane, methyl sulfolane, 1,3-propanesultone and the like. These solvents may be used alone, or may be used in combination of two or more of these solvents.

The nonaqueous electrolytic solution may contain an additive as necessary. For example, an unsaturated carbonate such as vinylene carbonate, vinyl ethylene carbonate, or divinyl ethylene carbonate may be added as an additive for forming a coating having high lithium ion conductivity on a surface of the negative electrode.

(Separator)

As a material of the separator, a nonwoven fabric made of cellulose fiber, a nonwoven fabric made of glass fiber, a microporous membrane made of polyolefin, a fabric cloth, a nonwoven fabric or the like is preferably used. A thickness of the separator ranges, for example, from 10 μm to 300 μm, inclusive, and preferably from 10 μm to 40 μm, inclusive.

Next, one example of a method for manufacturing an electrochemical device will be described. However, the method for manufacturing an electrochemical device is not limited to the following examples.

(i) Step of Preparing Negative Electrode

First, a negative electrode mixture substance containing a negative electrode active material, a binder and a conducting agent is dispersed in a liquid component (dispersion medium) to prepare a first slurry and a second slurry which have different compositions from each other. For the dispersion medium, water, N-methyl-2-pyrrolidone (NMP) or the like is preferably used.

At this time, mass ratio of each of the binder and the conducting agent relative to 100 parts by mass of the negative electrode active material in the first slurry is set to be less than mass ratio of each of the binder and the conducting agent relative to 100 parts by mass of the negative electrode active material in the second slurry. The first slurry is a raw material of the first negative electrode active material layer, and the second slurry is a raw material of the second negative electrode active material layer.

Next, The first slurry and the second slurry are applied to one surface and the other surface of the negative current collector, respectively, and dried and rolled. And thus the first negative electrode active material layer and the second negative electrode active material layer are formed. At the time of application, the first negative electrode active material layer may be formed to be thinner than the second negative electrode active material layer so that capacity Cs1 per unit area of the first negative electrode active material layer and capacity Cs2 per unit area of the second negative electrode active material layer satisfy $0.99 \leq Cs1/Cs2 \leq 1.01$. For example, mass Ms1 of the negative electrode active material supported per unit area of the first negative electrode active material layer and Ms2 of the negative electrode active material supported per unit area of the second negative electrode active material layer may be adjusted to satisfy $0.99 \leq Ms1/Ms2 \leq 1.01$.

(ii) Step of Preparing Positive Electrode

A positive electrode is formed, for example, by adhering a conductive polymer to a positive current collector. For example, by immersing a positive current collector in a solution (polymerization liquid) containing a polymerizable compound (monomer or oligomer) which is a raw material of a conductive polymer, and polymerizing the polymerizable compound in the presence of the positive current collector, a coating of the conductive polymer that covers the surface of the positive current collector is formed. The coating of the conductive polymer functions as a positive electrode active material layer.

While the polymerization method of the polymerizable compound may be electrolytic polymerization or chemical polymerization, the electrolytic polymerization is preferred from the view point of controllability of the coating in thickness. The electrolytic polymerization proceeds, for example, by arranging the positive current collector and a counter electrode oppose to each other, and flowing a current between the positive current collector as an anode and the counter electrode.

Before immersing the positive current collector in the polymerization liquid, a surface of the positive current collector may be roughened by etching, or a conductive carbon layer may be formed on a surface of the positive current collector. The conductive carbon layer may be formed by applying a carbon paste on a surface of the positive current collector, and drying the carbon paste. The carbon paste can be obtained by dispersing carbon black and a resin component in water or in an organic solvent.

The polymerization liquid may contain anion that is to be a dopant, and a conductive polymer doped with the anion may be generated. An oxidizing agent that promotes electrolytic polymerization may be added to the polymerization liquid. As a solvent of the polymerization liquid, water may be used, or an organic solvent may be used in consideration of the solubility of the polymerizable compound. As the organic solvent, alcohols are preferred, and ethyl alcohol, methyl alcohol, isopropyl alcohol, ethylene glycol, propylene glycol or the like can be used.

While the condition of the electrolytic polymerization is not particularly limited, and can be appropriately selected, it is preferred to adjust the polymerization liquid to have a pH ranging from 0 to 6, and a temperature ranging from 0° C. to 45° C. A current density is not particularly limited; however, preferably it ranges from 0.1 mA/cm$^2$ to 100 mA/cm$^2$. A concentration of the polymerizable compound in the polymerization liquid preferably ranges from 0.01 mol/L to 3 mol/L, inclusive, and a concentration of anion that is to be a dopant preferably ranges from 0.01 mol/L to 3 mol/L, inclusive.

The conductive polymer may be synthesized by chemical polymerization, and the positive electrode active material layer may be formed, for example, by mixing a conductive polymer synthesized by chemical polymerization with a conducting agent, a binder and the like to prepare a paste, and applying the paste on a surface of the positive current collector.

(iii) Step of Forming Electrode Group

It is effective that a step of pre-doping the negative electrode with lithium ions proceeds after incorporating a lithium foil into an electrode group, and housing the electrode group in a case of an electrochemical device together with a nonaqueous electrolytic solution. Before forming the electrode group, a lithium foil is attached on a surface of the negative electrode. At this time, by attaching a lithium foil to the second negative electrode active material layer but not to the first negative electrode active material layer, the step of attaching a lithium foil is simplified. And since a lithium foil having a thickness of 10 μm or more, further a thickness of 15 μm or more can be used, it becomes possible to greatly reduce the manufacturing cost. Thereafter, the positive electrode and the negative electrode to which the lithium foil is attached are wound or laminated with a separator interposed between the positive electrode and the negative electrode, to form an electrode group.

(iv) Step of Pre-Doping Negative Electrode with Lithium Ions

Figure 1:
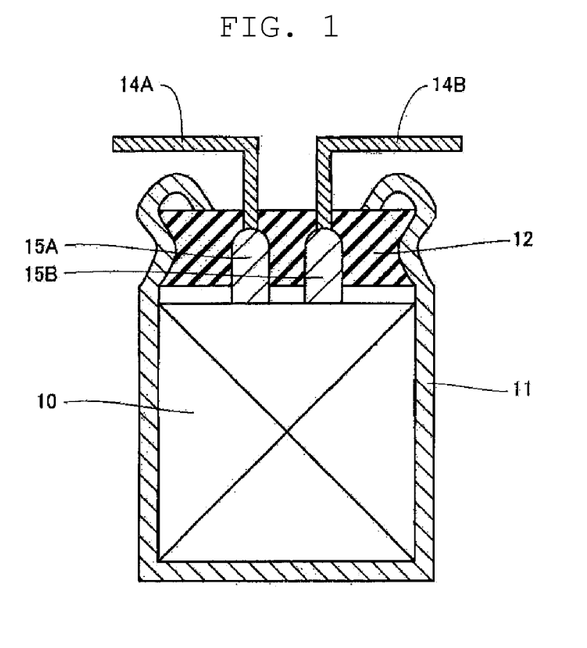
FIG. 1 is a schematic sectional view illustrating an electrochemical device according to an exemplary embodiment of the present disclosure.
Figure 2:
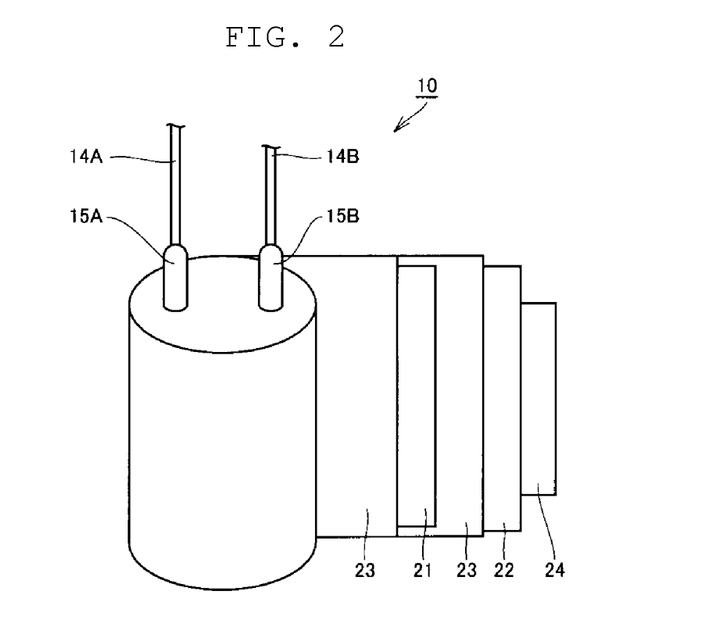
FIG. 2 is a schematic development of a part of the electrochemical device.

The electrode group together with the nonaqueous electrolytic solution is housed, for example, in a bottomed case having an opening. Thereafter, the opening is closed with a sealing body to complete an electrochemical device. FIG. 1 is a schematic sectional view illustrating one example of an electrochemical device, and FIG. 2 is a schematic view of a partial development of the electrochemical device. That is, the electrode group comes into contact with the nonaqueous electrolytic solution in the case. As the electrode group is immersed in the nonaqueous electrolytic solution, and the lithium foil and the nonaqueous electrolytic solution come into contact with each other, lithium ions elute in the nonaqueous electrolytic solution. The lithium ions migrate inside the electrode group, and are doped to the negative electrode active material contained in the first negative electrode active material layer and the second negative electrode active material layer. At this time, pre-doping with lithium ions rapidly proceeds when at least one of positive current collector and negative current collector has lithium ion permeability. Also, since the degree of freedom in migration of lithium ions is large, lithium ions are more likely to be pre-doped uniformly all over the negative electrode.

Electrode group 10 is a wound body as shown in FIG. 2 and includes positive electrode 21, negative electrode 22, and separator 23 disposed between positive electrode 21 and negative electrode 22. An outermost circumference of the wound body is fixed by fastening tape 24. Positive electrode 21 is connected to lead tab 15A and negative electrode 22 is connected to lead tab 15B. The electrochemical device includes electrode group 10, bottomed case 11 housing electrode group 10, sealing body 12 for closing an opening of bottomed case 11, lead wires 14A, 14B led out from sealing body 12, and a nonaqueous electrolytic solution (not shown). Lead wires 14A, 14B are connected to lead tabs 15A, 15B, respectively. Sealing body 12 is formed of, for example, an elastic material containing a rubber component. Bottomed case 11 is, at a part near an opening end, processed inward by drawing, and is, at the opening end, curled to swage sealing body 12.

In the exemplary embodiment described above, a wound electrochemical device having a cylindrical shape has been described. The application range of the present disclosure, however, is not limited to the wound electrochemical device and can also be applied to a square or a laminate type electrochemical device equipped with an electrode group having such a configuration that a positive electrode and a negative electrode are laminated with a separator disposed between the positive electrode and the negative electrode.

EXPERIMENTAL EXAMPLES

The following experiments were conducted to verify the effect of the present disclosure.

Experimental Example 1

(1) Preparation of Positive Electrode

Punching metal made of an aluminum foil as a raw material having a planar shape of about 2 cm square, a thickness of 30 μm and an aperture ratio of 10% was prepared as a positive current collector. On each of both sides of the punching metal, a conductive carbon layer having a thickness of 1.5 μm was formed. The conductive carbon layer is a mixed layer of 100 parts by mass of carbon black and 30 parts by mass of a binder.

On the other hand, a polymerization liquid having an aniline at a concentration of 1 mol/L and a sulfuric acid at a concentration of 2 mol/L was prepared. The polymerization liquid was adjusted to a pH of 0.6 and a temperature of 25° C. Then, a positive current collector having a conductive carbon layer and a stainless steel counter electrode were immersed in the polymerization liquid and subjected to electrolytic polymerization at a current density of 10 mA/cm2 to deposit a coating of a conductive polymer (polyaniline) doped with sulfate ions (SO42-) on the whole surfaces of two sides of the positive current collector, so that a positive electrode active material layer was formed. Thereafter, the positive electrode active material layer was washed with distilled water and dried.

(2) Preparation of Negative Electrode
(First Negative Electrode)

A copper foil having a planar shape of about 2 cm square, and a thickness of 20 μm was prepared as a first negative current collector. Then a first negative electrode mixture containing 97 parts by mass of hard carbon, 1.5 parts by mass of carboxymethyl cellulose (CMC), and 2 parts by mass of styrene butadiene rubber (SBR) was dispersed in water, to prepare a first slurry having a solid content of 40% by mass. The first slurry was applied on a first surface of the first negative current collector, and dried. After drying, rolling was conducted, and a first negative electrode having a first negative electrode active material layer having a thickness (T1) of 58 μm was obtained on the first surface of the first negative current collector.
(Second Negative Electrode)

A copper foil that is the same as the first negative current collector was prepared as a second negative current collector. Then a second negative electrode mixture containing 93.5 parts by mass of hard carbon, 1.5 parts by mass of carboxymethyl cellulose (CMC), and 5 parts by mass of styrene butadiene rubber (SBR) was dispersed in water, to prepare a second slurry having a solid content of 40% by mass. The second slurry was applied on a first surface of the second negative current collector, and dried. After drying, rolling was conducted, and a second negative electrode having a second negative electrode active material layer having a thickness (T2) of 60 μm was obtained on the first surface of the second negative current collector.

At this time, capacity Cs1 per unit area of the first negative electrode active material layer and capacity Cs2 per unit area of the second negative electrode active material layer are equivalent (Cs1/Cs2=1).

In the obtained negative electrode, mass (M1) of the negative electrode active material contained per unit mass of the first negative electrode active material layer was 0.965 g/g. And mass (M2) of the negative electrode active material contained per unit mass of the second negative electrode active material layer was 0.935 g/g. And thus the M1/M2 ratio was 1.032. Therefore, it is considered that capacity C1 per unit mass of the first negative electrode active material layer is greater than capacity C2 per unit mass of the second negative electrode active material layer, and the C1/C2 ratio is equivalent to the M1/M2 ratio.

Content X1 of the binder per unit mass of the first negative electrode active material layer (total amount of CMC and SBR) was 0.035 g/g, content X2 of the binder per unit mass of the second negative electrode active material layer was 0.065 g/g, and X1/X2 was 0.54.

Content Z1 of SBR per unit mass of the first negative electrode active material layer was 0.02 g/g, content Z2 of SBR per unit mass of the second negative electrode active material layer was 0.05 g/g, and Z1/Z2 was 0.4.
(3) Formation of Electrode Group A lithium foil having a thickness of 15 μm was attached on a surface of the second negative electrode active material layer. Then, a lead tab was connected with each of the positive electrode, the first negative electrode, and the second negative electrode. Next, the first negative electrode active material layer of the first negative electrode was opposed to the positive electrode active material layer formed on the one of the positive electrode while a separator of nonwoven fabric made of cellulose (thickness 35 μm) was interposed between the first negative electrode active material layer and the positive electrode active material layer. Also, the positive electrode active material layer formed on the other surface of the positive electrode was opposed to the second negative electrode active material layer (surface on which the lithium foil is attached) of the second negative electrode while a separator as described above was interposed between the positive electrode active material layer and the second negative electrode active material layer. In this manner, the first negative electrode, the separator, the positive electrode, the separator, and the second negative electrode were laminated in that order to prepare a laminate, and thus an electrode group was obtained.
(4) Nonaqueous Electrolytic Solution To a mixture of propylene carbonate and dimethyl carbonate at a volume ratio of 1:1 was added vinylene carbonate in 0.2% by mass to prepare a nonaqueous solvent. $LiPF_6$ was dissolved in the resulting nonaqueous solvent in a concentration of 2 mol/L to prepare a nonaqueous electrolytic solution having hexafluorophosphate ions ($PF_6^-$) as anion to be doped and dedoped to the positive electrode.
(5) Preparation of Electrochemical Device An electrochemical device was assembled by housing the electrode group and the nonaqueous electrolytic solution in a bag-like outer packaging body formed of an Al laminate sheet, and sealing the outer packaging body. Thereafter, by causing pre-doping with lithium ions to the negative electrode to proceed by standing still (aging) at 25° C. for 24 hours, an electrochemical device (A1) was completed.

The negative electrode potential in the nonaqueous electrolytic solution after completion of the pre-doping is 0.2 V or less for metal lithium.

Experimental Example 2

An electrochemical device (B1) was prepared in the same manner as in Experimental Example 1 except that a second negative electrode active material layer having a thickness of 58 μm was formed on a surface of the second negative current collector using the first slurry. The designed capacitance was the same as the designed capacitance in Experimental Example 1.

Experimental Example 3

An electrochemical device (B2) was prepared in the same manner as in Experimental Example 1 except that a second negative electrode active material layer having a thickness of 60 μm was formed on a surface of the first negative current collector using the second slurry. The designed capacitance was the same as the designed capacitance in Experimental Example 1.
[Evaluation]

Initial discharge capacitance (C0) and internal resistance (R0) of the electrochemical device were measured at 25° C. and −10° C. at a discharge current of 25 mA and at a voltage range of 3.8 V to 3.0 V.

Table 1 shows results of the above evaluation.

TABLE 1

| Electrochemical device | | A1 | B2 |
|---|---|---|---|
| 25° C. | $C_0$(F) | 3.34 | 3.26 |
|  | $R_0$ (mΩ) | 2.96 | 3.49 |
| −10° C. | $C_1$(F) | 1.21 | 1.21 |
|  | $R_1$ (mΩ) | 22.8 | 25.98 |

As shown in Table 1, the internal resistance at 25° C. in Experimental Example 1 reduced by about 16% as compared with Experimental Example 3, and the internal resistance at −10° C. reduced by 12% as compared with Experimental Example 3.

In the case of Experimental Example 2, the task of attaching a lithium foil to the second negative electrode active material layer was difficult, and the initial capacitance and the internal resistance were unable to be measured. It is considered that pre-doping does not proceed sufficiently, and the initial capacitance extremely reduces, and the internal resistance extremely increases.

In the above experimental examples, each electrochemical device has the same designed capacitance; however, the energy density of Experimental Example 1 can be made larger than the energy density of Experimental Example 3 because the negative electrode of Experimental Example 1 can be made thinner than the negative electrode of Experimental Example 3. Therefore, it is also possible to further increase the capacitance of the electrochemical device.

As in the above experimental examples, when a conductive assistant is not contained in the negative electrode active material layer, it is possible to increase the density of the negative electrode active material (hard carbon) in the negative electrode active material layer, and increase the capacity of the negative electrode. Also, since generation of the surface coating (SEI) on a surface of the negative electrode active material layer can be suppressed by not using a conductive assistant, it is also possible to reduce the irreversible capacity due to generation of SEI.

The electrochemical device according to the present disclosure can be suitably applied, for example, to the use required to have a higher capacitance than an electric double layer capacitor and a higher output than a lithium ion secondary battery.

The invention claimed is:

1. An electrochemical device comprising:
a positive electrode;
a negative electrode including a negative current collector, a first negative electrode active material layer, and a second negative electrode active material layer, the first negative electrode active material layer being supported on a first surface of the negative current collector, the second negative electrode active material layer being supported on a second surface of the negative current collector;
a separator disposed between the positive electrode and the negative electrode; and
a nonaqueous electrolytic solution having lithium ion conductivity, wherein:
each of the first negative electrode active material layer and the second negative electrode active material layer contains a carbon material as a negative electrode active material, and
capacity C1 per unit mass of the first negative electrode active material layer is greater than capacity C2 per unit mass of the second negative electrode active material layer, and
capacity Cs1 per unit area of the first negative electrode active material layer and capacity Cs2 per unit area of the second negative electrode active material layer satisfy $0.99 \leq Cs1/Cs2 \leq 1.01$.

2. The electrochemical device according to claim 1, wherein:
each of the first negative electrode active material layer and the second negative electrode active material layer further contains a binder, and
content X1 of the binder per unit mass of the first negative electrode active material layer is less than content X2 of the binder per unit mass of the second negative electrode active material layer.

3. The electrochemical device according to claim 1, wherein thickness T1 of the first negative electrode active material layer is smaller than thickness T2 of the second negative electrode active material layer.

4. The electrochemical device according to claim 2, wherein thickness T1 of the first negative electrode active material layer is smaller than thickness T2 of the second negative electrode active material layer.

5. The electrochemical device according to claim 1, wherein an arithmetic average roughness Ra2 of a surface of the second negative electrode active material layer at a side far from the negative current collector is less than an arithmetic average roughness Ra1 of a surface of the first negative electrode active material layer at a side far from the negative current collector.

6. The electrochemical device according to claim 1, wherein:
at least the second negative electrode active material layer contains a conductive assistant, and
content Y2 of the conductive assistant per unit mass of the second negative electrode active material layer is more than content Y1 of the conductive assistant per unit mass of the first negative electrode active material layer.

7. An electrochemical device comprising:
a positive electrode;
a negative electrode including a negative current collector, a first negative electrode active material layer, and a second negative electrode active material layer, the first negative electrode active material layer being supported on a first surface of the negative current collector, the second negative electrode active material layer being supported on a second surface of the negative current collector;
a separator disposed between the positive electrode and the negative electrode; and
a nonaqueous electrolytic solution having lithium ion conductivity, wherein:
the first negative electrode active material layer contains a negative electrode active material identical to the negative electrode active material contained in the second negative electrode active material layer,
the negative electrode active material is at least one selected from the group consisting of a carbon material, a metal compound, an alloy, and a ceramic material, and
capacity C1 per unit mass of the first negative electrode active material layer is greater than capacity C2 per unit mass of the second negative electrode active material layer, and
capacity Cs1 per unit area of the first negative electrode active material layer and capacity Cs2 per unit area of the second negative electrode active material layer satisfy $0.99 \leq Cs1/Cs2 \leq 1.01$.

8. The electrochemical device according to claim 7, wherein:
each of the first negative electrode active material layer and the second negative electrode active material layer further contains a binder, and
content X1 of the binder per unit mass of the first negative electrode active material layer is less than content X2 of the binder per unit mass of the second negative electrode active material layer.

9. The electrochemical device according to claim 7, wherein thickness T1 of the first negative electrode active material layer is smaller than thickness T2 of the second negative electrode active material layer.

10. The electrochemical device according to claim 8, wherein thickness T1 of the first negative electrode active material layer is smaller than thickness T2 of the second negative electrode active material layer.

11. The electrochemical device according to claim 7, wherein an arithmetic average roughness Ra2 of a surface of the second negative electrode active material layer at a side far from the negative current collector is less than an arithmetic average roughness Ra1 of a surface of the first negative electrode active material layer at a side far from the negative current collector.

12. The electrochemical device according to claim 7, wherein:
- at least the second negative electrode active material layer contains a conductive assistant, and
- content Y2 of the conductive assistant per unit mass of the second negative electrode active material layer is more than content Y1 of the conductive assistant per unit mass of the first negative electrode active material layer.

13. An electrochemical device comprising:
- a positive electrode;
- a negative electrode including a negative current collector, a first negative electrode active material layer, and a second negative electrode active material layer, the first negative electrode active material layer being supported on a first surface of the negative current collector, the second negative electrode active material layer being supported on a second surface of the negative current collector;
- a separator disposed between the positive electrode and the negative electrode; and
- a nonaqueous electrolytic solution having lithium ion conductivity, wherein:
- capacity C1 per unit mass of the first negative electrode active material layer is greater than capacity C2 per unit mass of the second negative electrode active material layer, and
- capacity Cs1 per unit area of the first negative electrode active material layer and capacity Cs2 per unit area of the second negative electrode active material layer satisfy $0.99 \leq Cs1/Cs2 \leq 1.01$.

14. The electrochemical device according to claim 13, wherein:
- each of the first negative electrode active material layer and the second negative electrode active material layer contains a negative electrode active material capable of doping or dedoping with lithium ions, and a binder, and
- content X1 of the binder per unit mass of the first negative electrode active material layer is less than content X2 of the binder per unit mass of the second negative electrode active material layer.

15. The electrochemical device according to claim 13, wherein thickness T1 of the first negative electrode active material layer is smaller than thickness T2 of the second negative electrode active material layer.

16. The electrochemical device according to claim 14, wherein thickness T1 of the first negative electrode active material layer is smaller than thickness T2 of the second negative electrode active material layer.

17. The electrochemical device according to claim 13, wherein an arithmetic average roughness Ra2 of a surface of the second negative electrode active material layer at a side far from the negative current collector is less than an arithmetic average roughness Ra1 of a surface of the first negative electrode active material layer at a side far from the negative current collector.

18. The electrochemical device according to claim 13, wherein:
- at least the second negative electrode active material layer contains a conductive assistant, and
- content Y2 of the conductive assistant per unit mass of the second negative electrode active material layer is more than content Y1 of the conductive assistant per unit mass of the first negative electrode active material layer.

* * * * *